(12) United States Patent
Takahashi et al.

(10) Patent No.: US 10,150,407 B2
(45) Date of Patent: Dec. 11, 2018

(54) VEHICLE PERIPHERY ALERT DEVICE

(71) Applicant: TOYOTA JIDOSHA KABUSHIKI KAISHA, Toyota-shi (JP)

(72) Inventors: Yoshihiko Takahashi, Miyoshi (JP); Tomoya Kawasaki, Miyoshi (JP); Tetsuya Komoguchi, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/637,018

(22) Filed: Mar. 3, 2015

(65) Prior Publication Data
US 2015/0175063 A1 Jun. 25, 2015

Related U.S. Application Data

(63) Continuation of application No. 14/008,658, filed as application No. PCT/JP2011/059715 on Apr. 20, 2011.

(51) Int. Cl.
B60Q 1/50 (2006.01)
G08G 1/16 (2006.01)

(52) U.S. Cl.
CPC ............. B60Q 1/50 (2013.01); G08G 1/166 (2013.01); G08G 1/168 (2013.01)

(58) Field of Classification Search
None
See application file for complete search history.

(56) References Cited

U.S. PATENT DOCUMENTS

| 5,450,057 A | 9/1995 | Watanabe |
| 6,611,744 B1 | 8/2003 | Shimazaki et al. |
| 7,366,595 B1 | 4/2008 | Shimizu et al. |
| 2005/0192725 A1 | 9/2005 | Li |

(Continued)

FOREIGN PATENT DOCUMENTS

| EP | 2 319 740 A1 | 5/2011 |
| JP | 05-126948 | 5/1993 |

(Continued)

OTHER PUBLICATIONS

International Search Report dated Jul. 5, 2011 in PCT/JP11/59715 Filed Apr. 20, 2011.

(Continued)

Primary Examiner — Kerri McNally
Assistant Examiner — Kevin Lau
(74) Attorney, Agent, or Firm — Oblon, McClelland, Maier & Neustadt, L.L.P.

(57) ABSTRACT

Means to Solve the Problem
A vehicle periphery alert device is installed in a vehicle that operates when the vehicle starts to reverse from a parked state. The vehicle periphery alert device includes a detecting unit configured to detect a position and a movement direction of another vehicle behind the vehicle; an alert operation activating unit configured to perform a predetermined alert operation in the vehicle; and a control unit configured to set a virtual alert area behind the vehicle according to an angle formed by a movement direction of the vehicle and the movement direction of the another vehicle, and to activate the alert operation activating unit when a condition, including that the position of the another vehicle is in the alert area that has been set, is satisfied.

7 Claims, 14 Drawing Sheets

(56) References Cited

U.S. PATENT DOCUMENTS

| | | |
|---|---|---|
| 2006/0087416 A1 | 4/2006 | Kumabe et al. |
| 2006/0164128 A1 | 7/2006 | Kuttenberger et al. |
| 2006/0274147 A1 | 12/2006 | Chinomi et al. |
| 2006/0287825 A1 | 12/2006 | Shimizu et al. |
| 2006/0287826 A1 | 12/2006 | Shimizu et al. |
| 2008/0211644 A1 | 9/2008 | Buckley et al. |
| 2008/0306666 A1 | 12/2008 | Zeng et al. |
| 2009/0009314 A1 | 1/2009 | Taniguchi et al. |
| 2009/0312914 A1 | 12/2009 | Miller et al. |
| 2010/0066527 A1* | 3/2010 | Liou ............................. 340/461 |
| 2010/0201508 A1 | 8/2010 | Green et al. |
| 2010/0271237 A1 | 10/2010 | Reed et al. |
| 2010/0271238 A1 | 10/2010 | Reed et al. |
| 2011/0140920 A1 | 6/2011 | Schwartz |
| 2011/0175714 A1 | 7/2011 | Kobayashi et al. |
| 2011/0202240 A1 | 8/2011 | Rottner et al. |

FOREIGN PATENT DOCUMENTS

| | | |
|---|---|---|
| JP | 2001-006097 | 1/2001 |
| JP | 2001-055099 | 2/2001 |
| JP | 2005-056336 | 3/2005 |
| JP | 2005 323306 | 11/2005 |
| JP | 2006 168459 | 6/2006 |
| JP | 2006168459 A * | 6/2006 |
| JP | 2006-252389 A | 9/2006 |
| JP | 2007-038954 | 2/2007 |
| JP | 2007 112297 | 5/2007 |
| JP | 2007-196854 | 8/2007 |
| JP | 2010-204805 A | 9/2010 |
| WO | 2010/013542 A1 | 4/2010 |

OTHER PUBLICATIONS

Written Opinion dated Jul. 5, 2011, in International Application No. PCT/JP2011/059715, filed Apr. 20, 2011.

European Search Report dated Jul. 12, 2016 in PCT/JP2011/059715 (with English-language Translation).

* cited by examiner

FIG.14
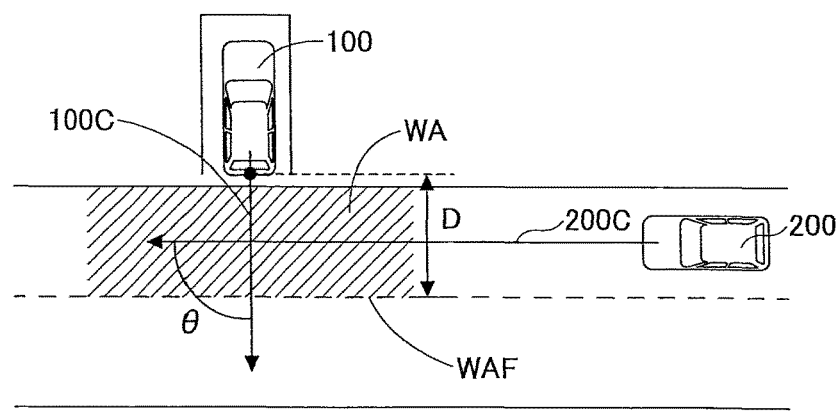
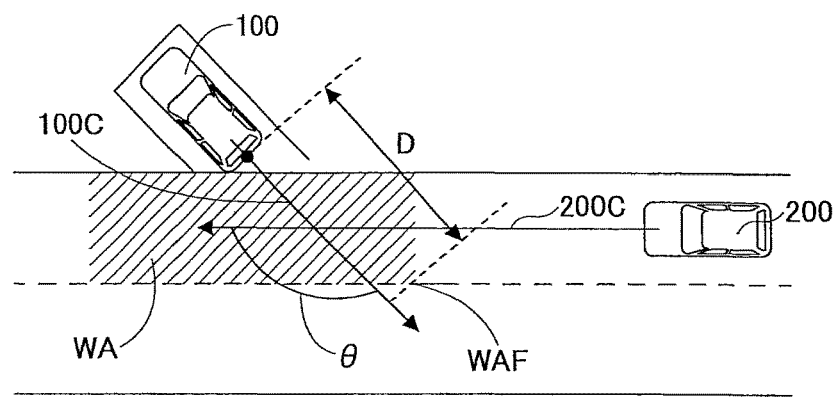
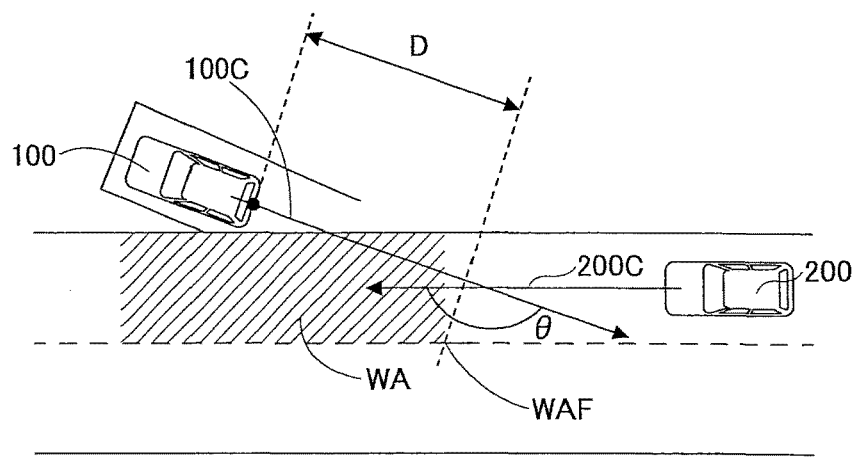

FIG.15
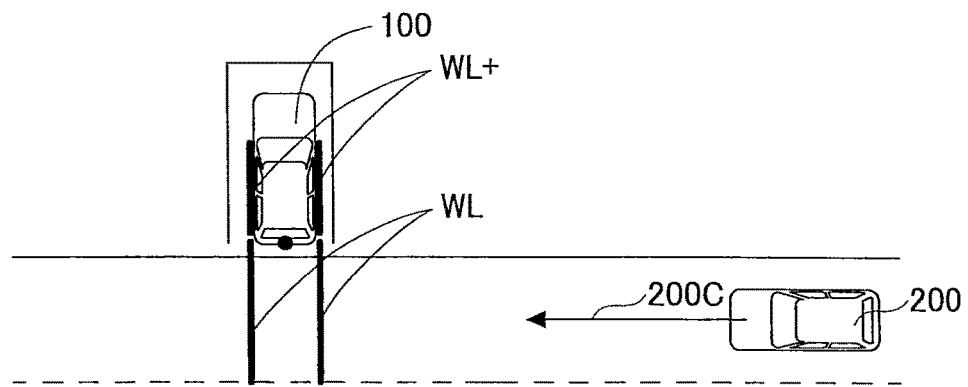
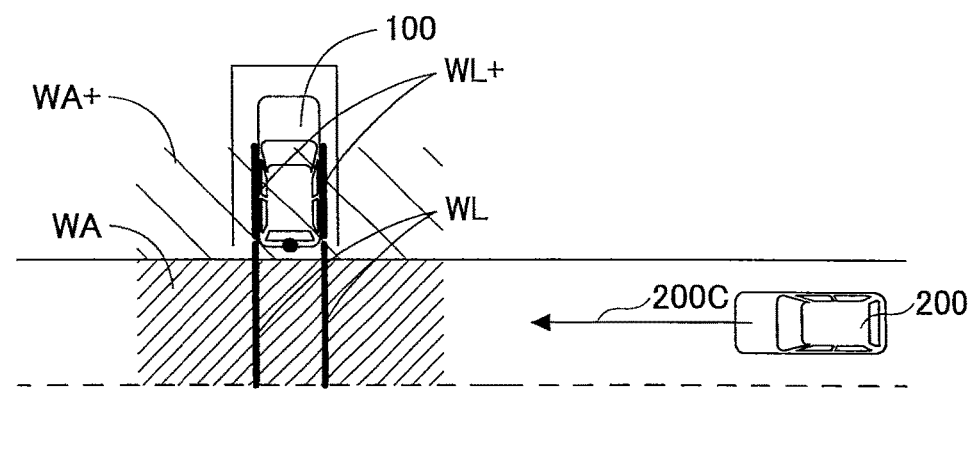

FIG.18
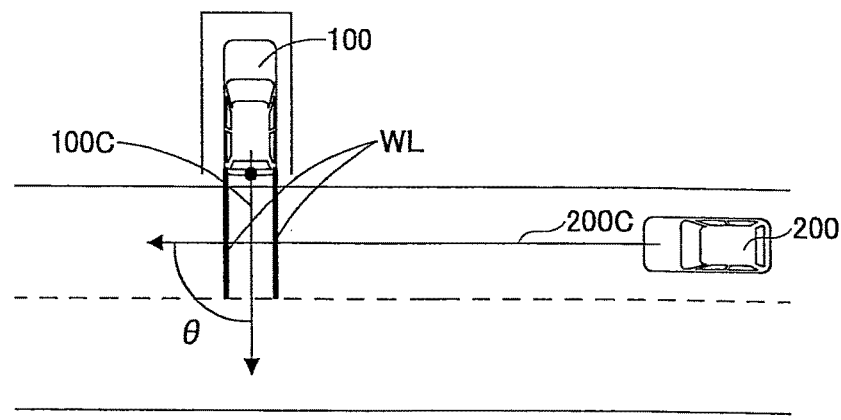
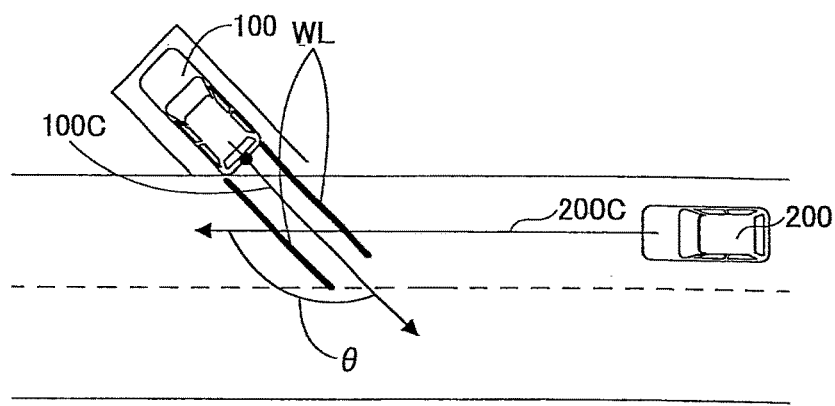
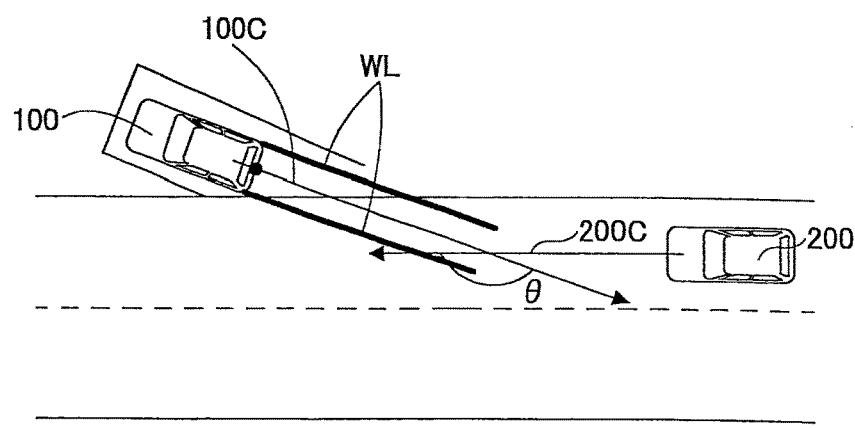

VEHICLE PERIPHERY ALERT DEVICE

CROSS REFERENCE TO RELATED APPLICATIONS

This application is a continuation of U.S. application Ser. No. 14/008,658, filed Sep. 30, 2013, which is a National Stage of PCT/JP11/059715, filed Apr. 20, 2011, and the entire contents of which are incorporated herein by reference.

TECHNICAL FIELD

The present invention is related to a vehicle periphery alert device that is installed in a vehicle and that operates when the vehicle starts to reverse from a parked state.

BACKGROUND ART

Conventionally, research and practical applications are carried forward for a device for making an alert regarding another vehicle that is likely to cross with a self-vehicle, when the self-vehicle starts to reverse after moving forward into a parked state. This type of device detects another vehicle that is approaching with a millimeter-wave radar, and when there is another vehicle moving in a predetermined alert area set based on the self-vehicle, the device performs control such as emitting an alert sound.

Incidentally, when parking a vehicle, the vehicle is not necessarily parked at a right angle with respect to the original driving lane (a regular driving road, including parts other than the inside of the parking frame at a parking lot where plural vehicles can be parked). It is assumed that the vehicle may be parked at a slanted angle or at a near-parallel angle with respect to the driving lane. Therefore, if the above alert area is set in a uniform manner, depending on the angle with respect to the driving lane, the alert area may deviate from the area that is supposed to be alerted.

There is known a cross traffic alert device considering the above problem (see, for example, patent document 1). In this device, by sampling the yaw rate and the steering angle until the parked state is reached, the parking angle that is the angle of the parked vehicle with respect to the driving lane is calculated, and the parking angle is stored in a non-volatile memory. When the parking state ends, and the vehicle starts to reverse, the angle range of the alert area is set based on the parking angle (FIGS. 2, 4, and 5).

PRIOR ART DOCUMENT

Patent Document 1: U.S. Patent Application Publication No. 2010/0271237

SUMMARY OF INVENTION

Problem to be Solved by Invention

However, with the above conventional device, the starting time point of sampling the yaw rate and the steering angle may not be accurate, and errors may occur due to the sampling cycle, etc., and therefore the parking angle may not be accurately calculated. Thus, the angle range of the alert area may not be appropriately set.

Furthermore, the information calculated until the parking state is reached is used for starting to move after the parking state has ended. Therefore, there is a need for a non-volatile memory for saving the data when the vehicle system is shut down, which may lead to an increase in the cost and weight.

The object of the present invention is to solve the above problems, and the main object is to provide a vehicle periphery alert device by which an alert can be appropriately made to another vehicle behind a vehicle, while suppressing an increase in the cost and weight.

Means to Solve the Problem

To achieve the above object, a first embodiment of the present invention is a vehicle periphery alert device installed in a vehicle that operates when the vehicle starts to reverse from a parked state, the vehicle periphery alert device including a detecting unit configured to detect a position and a movement direction of another vehicle behind the vehicle; an alert operation activating unit configured to perform a predetermined alert operation in the vehicle; and a control unit configured to set a virtual alert area behind the vehicle according to an angle formed by a movement direction of the vehicle and the movement direction of the another vehicle, and to activate the alert operation activating unit when a condition, including that the position of the another vehicle is in the alert area that has been set, is satisfied.

According to the first embodiment of the present invention, a virtual alert area is set behind the vehicle according to an angle formed by a movement direction of the vehicle and the movement direction of the another vehicle, and the alert operation activating unit is activated when a condition, including that the position of the another vehicle is in the alert area that has been set, is satisfied, and therefore an alert can be appropriately made to another vehicle behind a vehicle, while suppressing an increase in the cost and weight.

To achieve the above object, a second embodiment of the present invention is a vehicle periphery alert device installed in a vehicle that operates when the vehicle starts to reverse from a parked state, the vehicle periphery alert device including a detecting unit configured to detect a position and a movement direction of another vehicle behind the vehicle; an alert operation activating unit configured to perform a predetermined alert operation in the vehicle; and a control unit configured to set a virtual alert line extending behind the vehicle from a side edge part of the vehicle, and to activate the alert operation activating unit when the another vehicle is determined to cross the alert line within a predetermined time.

According to the second embodiment of the present invention, a virtual alert line extending behind the vehicle from a side edge part of the vehicle is set, and the alert operation activating unit is activated when the another vehicle is determined to cross the alert line within a predetermined time, and therefore an alert can be appropriately made to another vehicle behind a vehicle, while suppressing an increase in the cost and weight.

Effects of the Invention

According to the present invention, a vehicle periphery alert device is provided, by which an alert can be appropriately made to another vehicle behind a vehicle, while suppressing an increase in the cost and weight.

BRIEF DESCRIPTION OF DRAWINGS

FIG. 14 illustrates an example of an alert area WA set by the periphery alert device-use ECU 30 according to a second embodiment;

FIG. 15 illustrates an example of alert lines WL set behind the self-vehicle 100;

FIG. 18 illustrates examples of alert lines WL set in various situations; and

BEST MODE FOR CARRYING OUT THE INVENTION

In the following, embodiments for carrying out the present invention are described with reference to attached drawings.

EMBODIMENTS

First Embodiment

Figure 1:
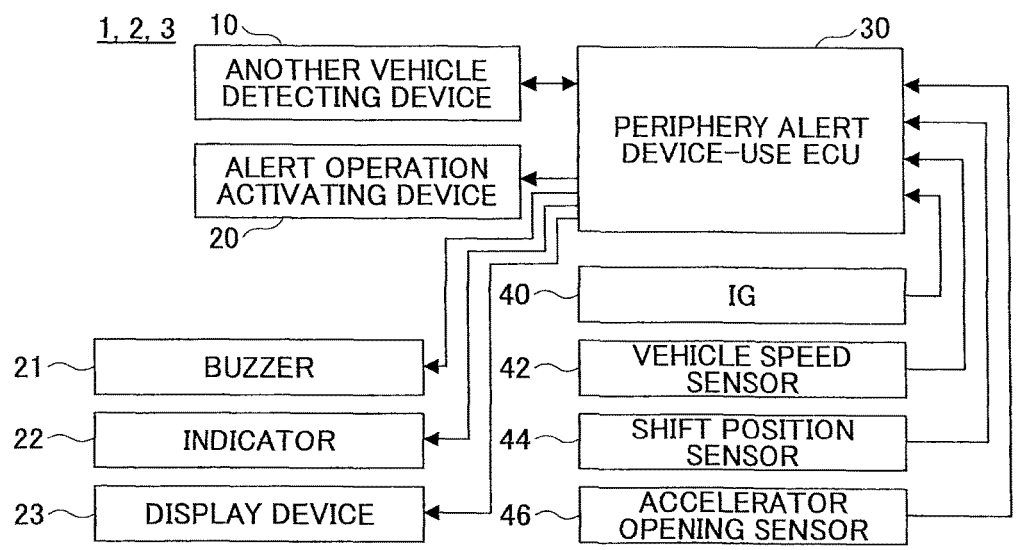
FIG. 1 illustrates a system configuration example of a vehicle periphery alert device 1 according to a first embodiment of the present invention.

In the following, with reference to drawings, a description is given of a vehicle periphery alert device 1 according to a first embodiment of the present invention. FIG. 1 illustrates a system configuration example of the vehicle periphery alert device 1 according to the first embodiment of the present invention. The vehicle periphery alert device 1 includes, as main elements, an another vehicle detecting device 10, an alert operation activating device 20, and a periphery alert device-use ECU (Electronic Control Unit) 30.

In the following description, a vehicle in which the vehicle periphery alert device 1 is installed is referred to as a "self-vehicle", and a vehicle that is a target of alert is referred to as "another vehicle".

Detection of Another Vehicle

Figure 2:
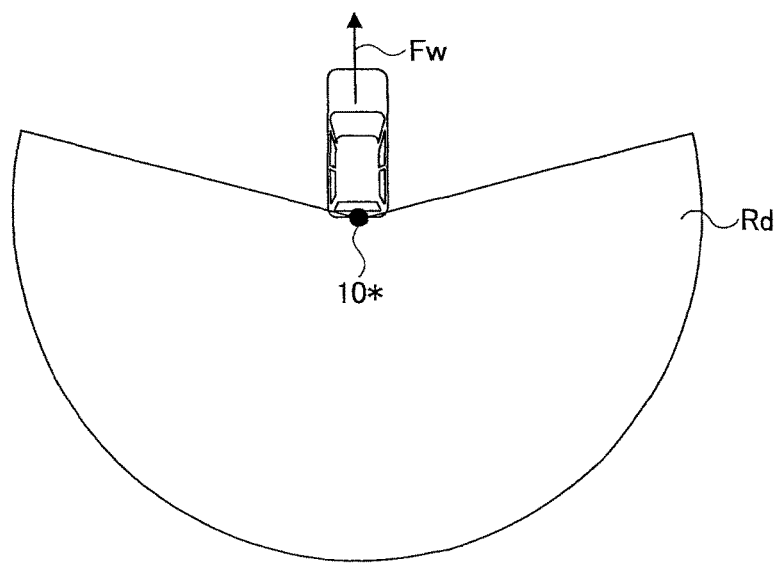
FIG. 2 illustrates an example of a detection possible range of another vehicle detecting device 10 that is a millimeter-wave radar device.
Figure 3:
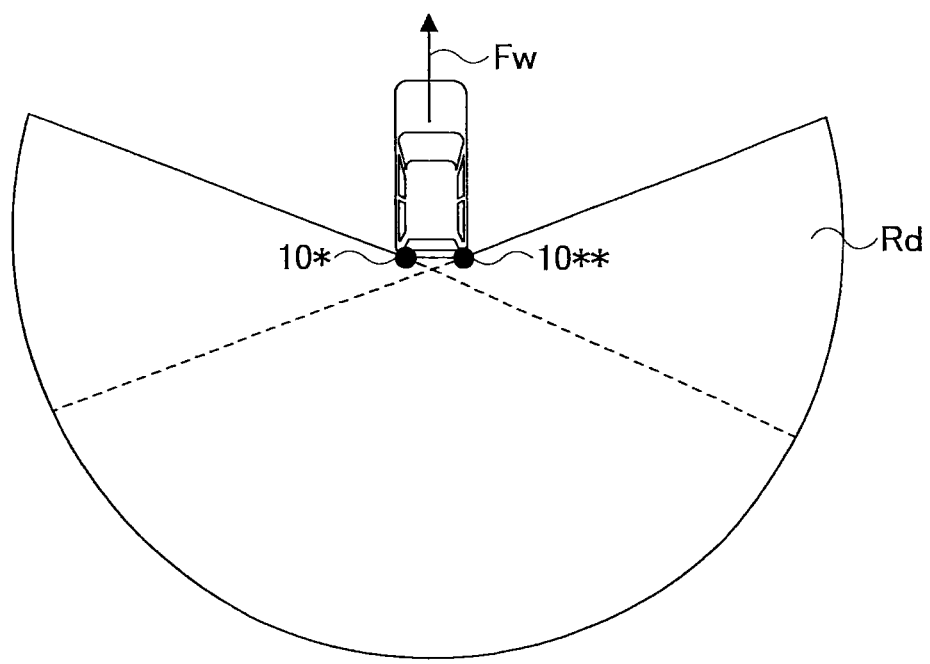
FIG. 3 illustrates an example of a detection possible range of another vehicle detecting device 10 that is a millimeter-wave radar device.

The another vehicle detecting device 10 is a millimeter-wave radar device installed inside the rear bumper of the self-vehicle, for example. The another vehicle detecting device 10 radiates an electromagnetic wave behind the vehicle through the bumper made of resin, etc., detects a reflective wave, and detects the position, the movement direction, and the speed of an obstacle behind the vehicle. FIGS. 2 and 3 illustrate an example of a detection possible range Rd of the another vehicle detecting device 10 that is a millimeter-wave radar device. As illustrated, the another vehicle detecting device 10 may include one millimeter-wave radar device 10*, or a plurality of millimeter-wave radar devices 10*, 10** . . . . In these diagrams, the forward movement direction of the self-vehicle is expressed as Fw.

There are various known methods for calculating the position, the movement direction, the speed, etc., performed at the millimeter-wave radar device. For example, calculations may be performed by using a FM-CW method and a DBF (Digital Beam Forming) method. In the following, a simple description of these methods is given.

First, the millimeter-wave radar device generates a modulation signal obtained by modulating a triangular wave, outputs a transmission signal that is modulated so that the frequency increases/decreases according to the slope of the triangular wave, and generates a beat signal obtained by mixing part of the transmission signal in a reception signal. Then, the millimeter-wave radar device performs a FFT (Fast Fourier Transform) process, etc. on the respective beat signals in an up interval and a down interval of the modulation cycle and generates frequency spectrum data, and searches for a peak frequency in which the reception wave intensity forms a peak, from the frequency spectrum data. Assuming that the found peak frequency in the up interval is fb1, and the found peak frequency in the down interval is fb2, the millimeter-wave radar device obtains a distance R between the self-vehicle and an obstacle and a relative speed V by the following formulas (1) through (4). In the formulas, fm is the repetition frequency of the triangular wave that is the source of the transmission-use signal, ΔF is the frequency shift, and $f_0$ is the center frequency of the modulation wave.

$$fr=(fb1+fb2)/2 \tag{1}$$

$$fd=(fb1-fb2)/2 \tag{2}$$

$$R=(C/(4 \cdot \Delta F \cdot fm)) \cdot fr \tag{3}$$

$$V=(C/(2 \cdot f_0)) \cdot fd \tag{4}$$

Furthermore, the orientation of the obstacle can be calculated by DBF. Electric waves that approach from a direction of an angle θ with respect to a center direction of the millimeter-wave radar device are received with an array antenna. The array antenna is constituted by element antennas #1, #2, #3 . . . arranged with intervals d. When the electric waves are received, the path length of the electric wave at the element antenna #2 is longer than the path length of the electric wave at the element antenna #1 by d sin θ. Therefore, the phase of the electric wave received by the element antenna #2 is delayed with respect to the phase of the electric wave received by the element antenna #1 by (2πd sin θ)/λ. λ, is the wavelength of the electric wave. Assuming that this delay is corrected with a phase shifter, the electric wave from the θ direction is received at both element antennas by the same phase, and the directivity is directed in the θ direction. DBF is a technology for forming the directivity of the antenna by combining the waves received by the respective antenna elements by performing conversion of the phase and the amplitude based on the above principle. Accordingly, the millimeter-wave radar device can obtain the orientation θ of the obstacle.

When the distance R, the relative speed V, and the orientation θ are calculated as described above, the millimeter-wave radar device can calculate the position of the obstacle based on a predetermined position of the self-vehicle, the movement direction of the obstacle based on the central axis (i.e., the movement direction) of the self-vehicle, and the movement speed of the obstacle, etc. The movement direction may be calculated by obtaining the difference between the obstacle and a relative position in a minimal period, or by performing vector calculation by using the relative speed V, the orientation angle θ, and the speed of the self-vehicle as parameters.

Furthermore, the millimeter-wave radar device extracts a vehicle from the obstacles by screening obstacles for which the position, the movement direction, and the speed, etc., have been calculated as described above, by using the reception wave intensity, the estimated size, and the speed, etc., as conditions. Accordingly, the millimeter-wave radar device can obtain the position, the movement direction based on the central axis of the self-vehicle, and the speed of another vehicle behind the self-vehicle. In the following, a description is given of the present embodiment on the premise of the above technology.

As a means for acquiring information such as the position of the another vehicle, a laser radar device and a stereo camera device, etc., may be applied, other than the above millimeter-wave radar.

Alert Control

The alert operation activating device 20 is, for example, a sound-emitting device such as a speaker, and as described below, the alert operation activating device 20 is controlled to output an alert sound based on the presence of another vehicle.

Furthermore, as a means for activating an alert operation, a buzzer 21, an indicator 22, and a display device 23, etc., may be provided, as illustrated.

The indicator 22 is attached to an inner mirror, an outer mirror, or a combination meter, etc., and the indicator 22 is an issuing means for performing lighting or blinking when activating an alert operation. Furthermore, the display device 23 is a display device shared with, for example, a navigation device, and performs lighting or blinking of an icon when activating an alert operation. These display devices may have a format of being able to indicate a left direction or a right direction by an arrow, etc., so that the driver can recognize the direction in which another vehicle is approaching when another vehicle is detected.

The periphery alert device-use ECU 30 is a computer unit in which elements such as a ROM and a RAM are connected to each other centering around a CPU via a bus. Furthermore, the periphery alert device-use ECU 30 also includes storage devices such as a HDD (Hard Disc Drive) and an EEPROM (Electrically Erasable and Programmable Read-Only Memory), an I/O port, a timer, a counter, etc.

Furthermore, signals are input to the periphery alert device-use ECU 30, such as output signals from switches/sensors including an ignition switch 40, a vehicle speed sensor 42, a shift position sensor 44, and an accelerator opening sensor 46, or state signals output by another ECU performing vehicle control using these signals, etc.

The periphery alert device-use ECU 30 causes the another vehicle detecting device 10 to operate when the self-vehicle starts to reverse from a parked state. When the position of another vehicle detected by the another vehicle detecting device 10 is in a virtual alert area extending behind the vehicle, the periphery alert device-use ECU 30 causes the alert operation activating device 20 to operate and output an alert sound. In this case, the another vehicle which is an alert target may be limited to another vehicle that is "approaching", i.e., the relative distance is being reduced. Furthermore, the conditions for causing the alert operation activating device 20 to operate may include other conditions, such as the speed of the self-vehicle or the another vehicle is greater than or equal to a predetermined speed.

The determination as to whether the vehicle is in a "parked state" may be made according to set conditions such as (1) an ACC off signal is input from the ignition switch 40, and (2) a vehicle speed signal input from the vehicle speed sensor 42 is indicating greater than or equal to a specified time zero, and a signal input from the shift position sensor 44 is indicating "P" (parking).

The determination as to whether a vehicle is "starting to reverse" may be made according to set conditions such as the signal input from the shift position sensor 44 indicated "R" (reverse) after the period of the above "parked state".

Desired conditions may be set as the above set conditions, and there are no limitations in terms of the application of the present invention.

Figure 4:
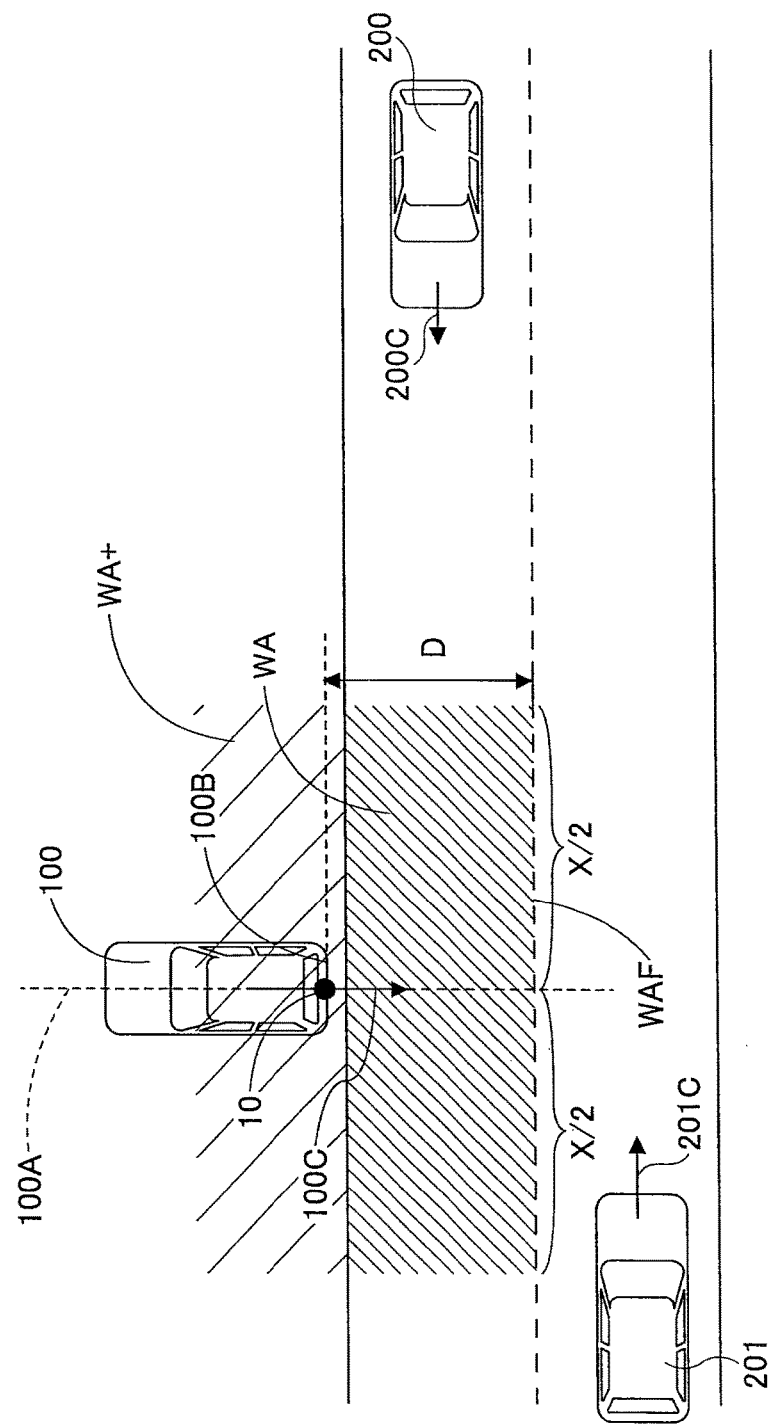
FIG. 4 illustrates an example of an alert area WA set by a periphery alert device-use ECU 30 when a self-vehicle 100 progresses and parks in a right angle with respect to the road, and then starts reversing.

FIG. 4 illustrates an example of an alert area WA set by the periphery alert device-use ECU 30 when a self-vehicle 100 progresses and parks at a right angle with respect to the road, and then starts reversing. As illustrated, the alert area WA has a predetermined width X in the direction of the width of the vehicle, centering around a vehicle central axis 100A of the self-vehicle 100, and is set as a rectangular area, which starts from a back end part 100B of the self-vehicle 100 toward the back of the self-vehicle 100, along a vehicle central axis A direction of the self-vehicle, so that a furthest end part WAF reaches a predetermined distance D. Furthermore, as illustrated, this alert area may include an area WA+ that extends from the back end part 100B of the self-vehicle 100 toward the front of the self-vehicle 100 (hereinafter, illustrations and descriptions of this are omitted).

The alert area WA may be set for each another vehicle that is the target. Accordingly, when plural another vehicles 200, 201 are moving behind the self-vehicle 100, even if another vehicle is moving in the alert area set for the another vehicle 200, there may be situations where the alert operation activating device 20 is not activated.

Figure 5:
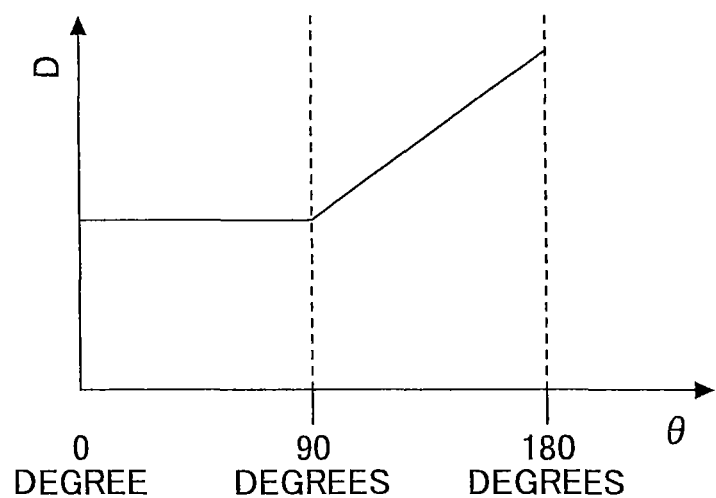
FIG. 5 illustrates an example of a corresponding relationship between a distance D and an angle θ.
Figure 6:
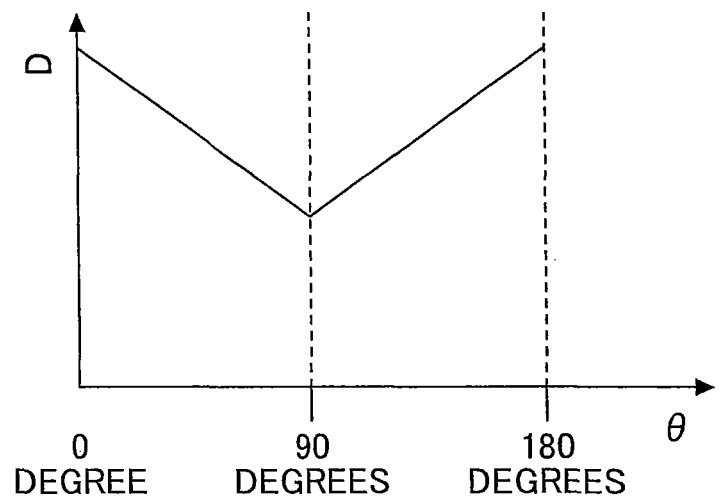
FIG. 6 illustrates an example of a corresponding relationship between a distance D and an angle θ.

The periphery alert device-use ECU 30 determines the distance to the furthest end part WAF in the alert area WA according to an angle θ formed by the movement direction of the self-vehicle and the movement direction of another vehicle. FIGS. 5 and 6 are diagrams illustrating examples of corresponding relationships between the distance D and the angle θ. Note that in FIG. 4, a movement direction 100C of the self-vehicle 100 and movement directions 200C, 201C of the another vehicles 200, 201 are indicated by arrows.

(1) As indicated in FIG. 5, the distance D is fixed when the angle θ formed by the movement direction of the self-vehicle and the movement direction of the another vehicle is between zero degrees and 90 degrees. When the angle θ is between 90 degrees and 180 degrees, the distance D may be set so as to be shorter as the angle θ becomes closer to 90 degrees, and to be longer as the angle θ becomes closer to 180 degrees.

(2) Furthermore, as indicated in FIG. 6, the distance D may be set so as to be shorter as the angle θ formed by the movement direction of the self-vehicle and the movement direction of the another vehicle becomes closer to 90 degrees, and to be longer as the angle θ becomes further away from 90 degrees.

Note that in these diagrams, the distance D changes in a linear manner in accordance with changes in the angle θ; however, the distance D may change in a curved manner or in a stepwise manner.

In the example of FIG. 4, an angle formed by the movement direction 100C of the self-vehicle 100 and the movement directions 200C, 201C of the another vehicles 200, 201 is 90 degrees, and therefore the distance D is minimum in both cases of complying with (1) or (2).

FIGS. 7 through 10 illustrate examples of alert areas WA set in various situations, in a case of complying with (1) described above.

Figure 7:
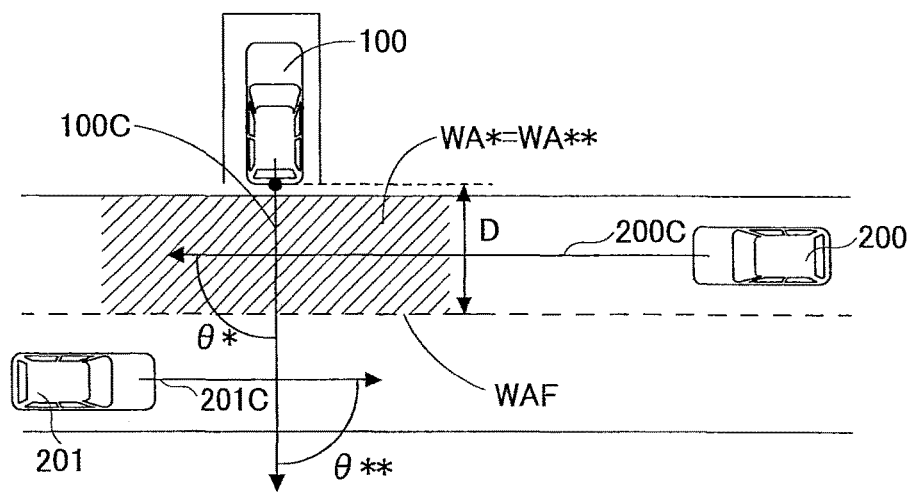
FIG. 7 illustrates examples of alert areas WA set in various situations.

In the example of FIG. 7, an angle θ* formed by the movement direction 100C of the self-vehicle 100 and the movement direction 200C of the another vehicle 200 is 90 degrees, and therefore the distance D of an alert area WA* with respect to the another vehicle 200 is minimum. Furthermore, an angle θ formed by the movement direction 100C of the self-vehicle 100 and the movement direction 201C of the another vehicle 201 is 90 degrees, and therefore the distance D of an alert area WA with respect to the another vehicle 200 is also minimum. As a result, the alert areas WA* and WA** match each other. In the example of FIG. 7, when the another vehicle 200 enters the alert area WA*, the alert operation activating device 20 is activated. However, the another vehicle 201 is moving further away than a furthest end part WAF of the alert area WA, and therefore even if the another vehicle 201 continues to move in this manner, the alert operation activating device 20 is not activated.

Figure 8:
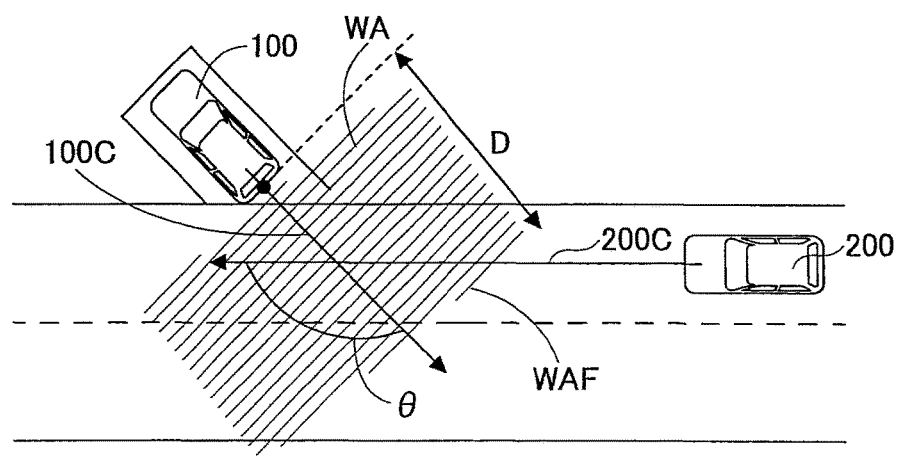
FIG. 8 illustrates examples of alert areas WA set in various situations.

In the example illustrated in FIG. 8, an angle θ formed by the movement direction 100C of the self-vehicle 100 and the movement direction 200C of the another vehicle 200 is, for example, 135 degrees, and therefore the alert area WA* with respect to the another vehicle 200 has a longer distance D compared to the example of illustrated in FIG. 7.

Figure 9:
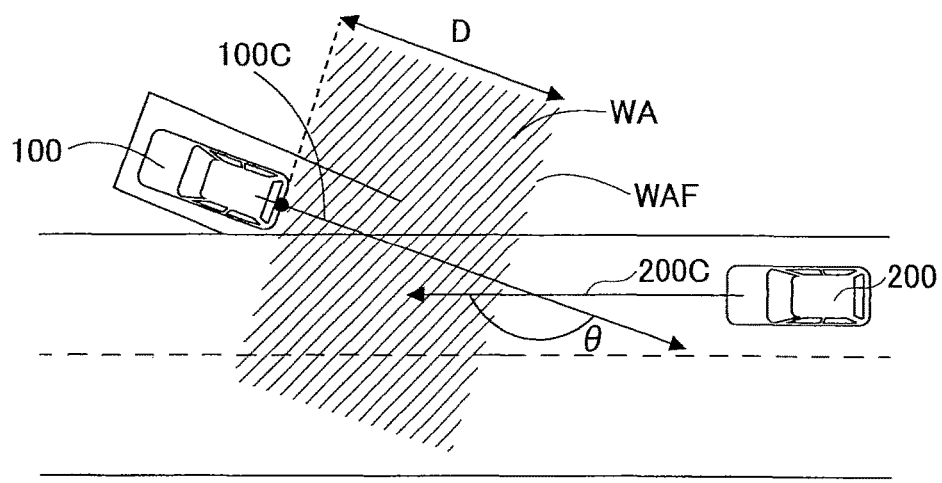
FIG. 9 illustrates examples of alert areas WA set in various situations.

In the example illustrated in FIG. 9, an angle θ formed by the movement direction 100C of the self-vehicle 100 and the movement direction 200C of the another vehicle 200 is, for example, 160 degrees, and therefore the alert area WA* with respect to the another vehicle 200 has an even more longer distance D compared to the example of illustrated in FIG. 8.

As illustrated in FIGS. 8 and 9, in a situation where the self-vehicle 100 is starting to reverse and another vehicle is approaching from an opposite direction and an alert is necessary, the alert area WA is extended away from the self-vehicle 100. As a result, an alert can be appropriately made to another vehicle behind the vehicle.

Figure 10:
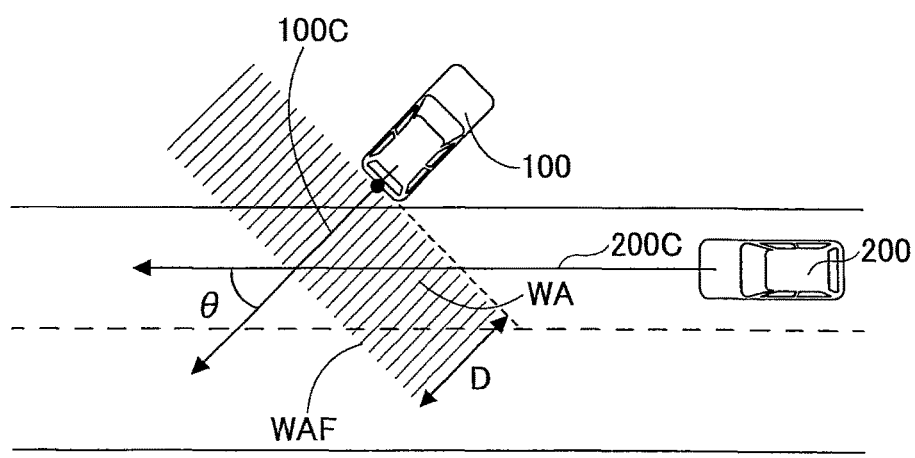
FIG. 10 illustrates examples of alert areas WA set in various situations.

Meanwhile, in the example illustrated in FIG. 10, an angle formed by the movement direction 100C of the self-vehicle 100 and the movement direction 200C of the another vehicle 200 is 45 degrees, and therefore the alert area WA* with respect to the another vehicle 200 has the shortest distance D.

Figure 11:
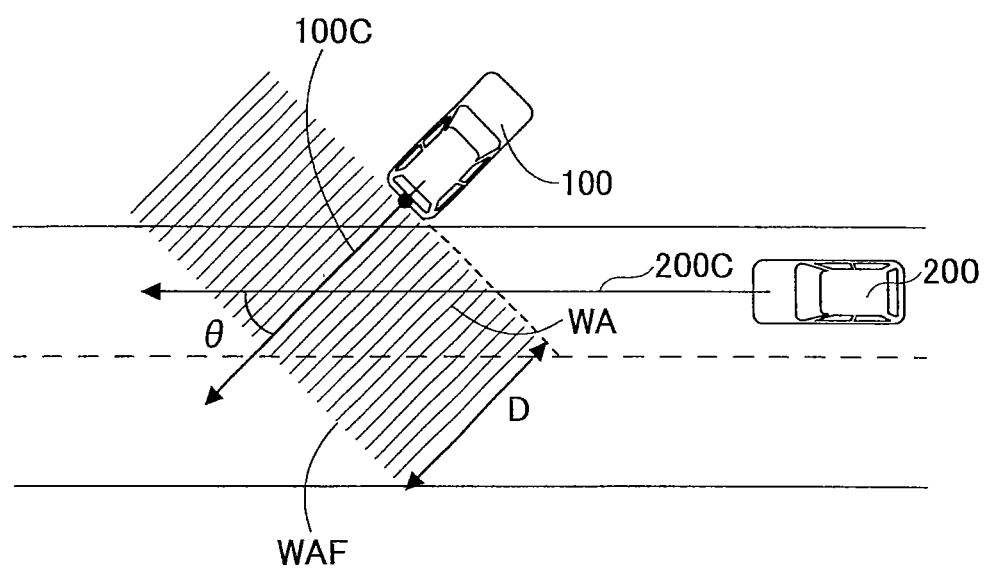
FIG. 11 illustrates examples of alert areas WA set in various situations.

Note that in the case of complying with (2) described above, only the situation of FIG. 10 is different. FIG. 11 illustrates an example of complying with (2) described above and an alert area WA set in the same situation as that of FIG. 10. In this case, an angle θ formed by the movement direction 100C of the self-vehicle 100 and the movement direction 200C of the another vehicle 200 is away from 90 degrees, and therefore the alert area WA* with respect to the another vehicle 200 has a longer distance D compared to the example of illustrated in FIG. 7.

The angle of the self-vehicle and the another vehicle is not limited to changing according to the angle with respect to the road when the self-vehicle is parked, but may dynamically change according to the movement of the self-vehicle from the parked position to the road. Therefore, the alert area WA is not fixed once it is set at the time of starting to move. Rather, the alert area WA may be reset according to the movement of the self-vehicle (for example, at every predetermined movement distance).

Figure 12:
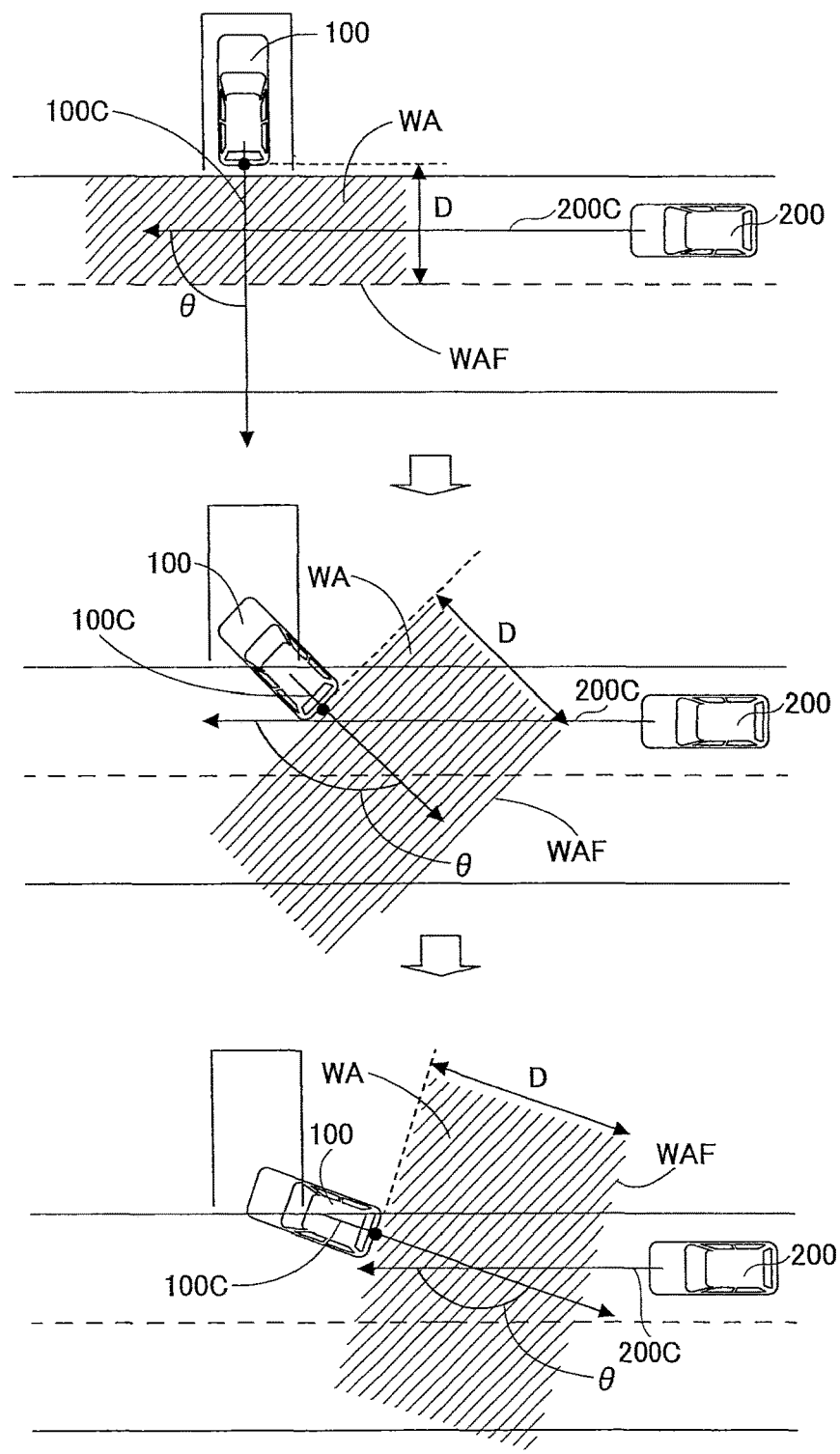
FIG. 12 illustrates how an alert area WA is being reset according to the movement of the self-vehicle 100.

FIG. 12 illustrates how an alert area WA is being reset according to the movement of the self-vehicle 100. As illustrated, as the self-vehicle 100 moves toward the road, the angle formed by the movement direction 100C of the self-vehicle 100 and the movement direction 200C of the another vehicle 200 also changes, and therefore the alert area WA is appropriately reset.

Process Flow

Figure 13:
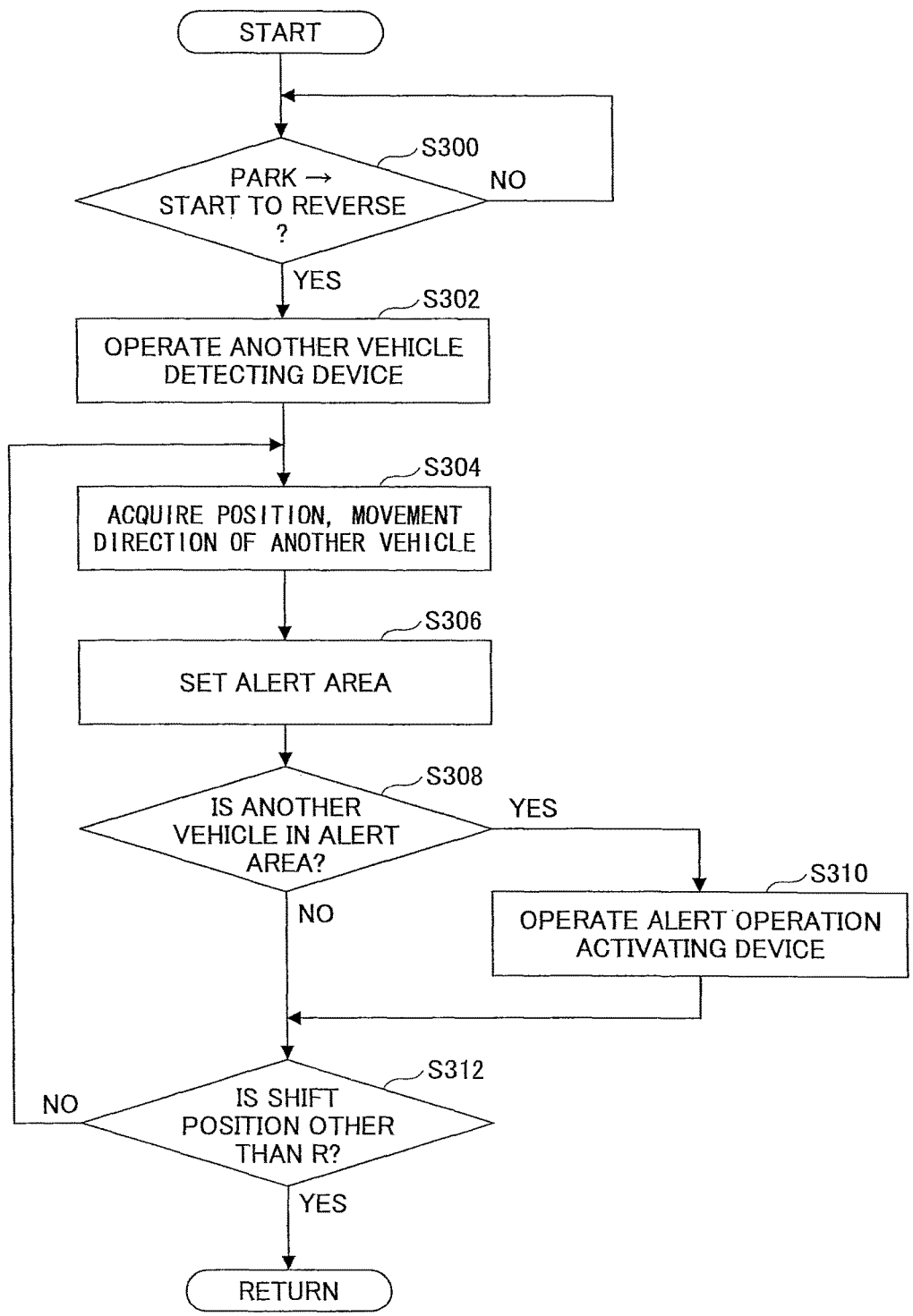
FIG. 13 is a flowchart illustrating the flow of a process executed by the periphery alert device-use ECU 30.

In the following, a description is given of a process flow for realizing control as described above. FIG. 13 is a flowchart illustrating the flow of a process executed by the periphery alert device-use ECU 30.

First, the periphery alert device-use ECU 30 determines whether this is a situation where the self-vehicle is starting to reverse from a parked state (step S300). Specific contents of the determination are described above.

When the periphery alert device-use ECU 30 determines that this is a situation where the self-vehicle is starting to reverse from a parked state, the periphery alert device-use ECU 30 causes the another vehicle detecting device 10 to operate (step S302), and acquires the position and the movement direction of another vehicle (step S304).

Next, the periphery alert device-use ECU 30 sets an alert area based on the position and the movement direction of the another vehicle (step S306).

Then, the periphery alert device-use ECU 30 determines whether the another vehicle is moving in the alert area (step S308). When the another vehicle is moving in the alert area, the periphery alert device-use ECU 30 causes the alert operation activating device 20 to operate (step S310).

The periphery alert device-use ECU 30 repeats the processes of steps S304 through S310 until the shift position becomes a position other than "R" (step S312). The processes of steps S304 through S306 may be performed at a lower frequency compared to the processes of steps S308 through S310.

Overview

According to the vehicle periphery alert device 1 of the present embodiment described above, the distance D to the furthest end part WAF of the alert area WA is determined according to the angle θ formed by the movement direction of the self-vehicle and the movement direction of the another vehicle, and therefore an alert can be appropriately made to another vehicle behind the vehicle. Furthermore, there is no need to calculate the parking angle in advance at the time of parking or storing the parking angle in a non-volatile memory, and therefore an alert can be appropriately made to another vehicle behind the vehicle while suppressing an increase in the cost and weight.

Second Embodiment

In the following, with reference to drawings, a description is given of a vehicle periphery alert device 2 according to a second embodiment of the present invention. The basic configuration is the same as the first embodiment, and therefore reference is made to FIG. 1, and descriptions of basic functions of the respective elements are omitted.

The detection of another vehicle is performed in the same manner as the first embodiment, and therefore a description thereof is omitted.

Alert Control

The periphery alert device-use ECU 30 according to the second embodiment does not change the alert area WA by extension and contraction as in the first embodiment, but rotates the alert area WA so that the longitudinal direction of the alert area WA extends along a movement direction of another vehicle.

FIG. 14 illustrates an example of an alert area WA set by the periphery alert device-use ECU 30 according to the second embodiment. As illustrated, the periphery alert device-use ECU 30 according to the second embodiment rotates the alert area WA so that a longitudinal direction WAL of the alert area WA extends along the movement direction 200C of another vehicle 200. Accordingly, as a result, the distance D is extended to the furthest end part WAF of the alert area WA.

As a result, similar to the first embodiment, in a situation requiring an alert, the alert area WA is extended away from the self-vehicle 100. As a result, an alert is appropriately made to another vehicle behind the vehicle.

According to the vehicle periphery alert device 2 of the present embodiment described above, the alert area WA is rotated so as to extend along the movement direction 200C of the another vehicle 200, and therefore an alert can be appropriately made to another vehicle behind the vehicle. Furthermore, there is no need to calculate the parking angle advance at the time of parking or storing the parking angle in a non-volatile memory, and therefore an alert can be appropriately made to another vehicle behind the vehicle, while suppressing an increase in the cost and weight.

Third Embodiment

In the following, with reference to drawings, a description is given of a vehicle periphery alert device 3 according to a third embodiment of the present invention. The basic configuration is the same as the first embodiment, and therefore reference is made to FIG. 1, and descriptions of basic functions of the respective elements are omitted.

The detection of another vehicle is performed in the same manner as the first embodiment, and therefore a description thereof is omitted.

Alert Control

The periphery alert device-use ECU 30 according to the third embodiment sets a virtual alert line WL instead of the alert area WA, and when the periphery alert device-use ECU 30 determines that another vehicle crosses the alert line WL within a predetermined time, the periphery alert device-use ECU 30 causes the alert operation activating device 20 to operate.

FIG. 15 illustrates an example of alert lines WL set behind the self-vehicle 100. As illustrated, alert lines WL are lines extending behind the self-vehicle 100 from the side edge parts of the self-vehicle 100. Furthermore, as illustrated, alert lines may include lines WL+ extending forward from the trailing edge parts of the side edge parts of the self-vehicle 100.

Furthermore, the vehicle periphery alert device 3 according to the present embodiment may perform an alert operation using the alert area WA as in the first and second embodiments, in addition to the alert operation using the alert lines WL. The bottom stage in FIG. 15 schematically illustrates such a case.

The periphery alert device-use ECU 30 may determine whether the another vehicle 200 will cross the alert line WL based on the position and the movement direction 200C of the another vehicle 200. Furthermore, the periphery alert device-use ECU 30 may calculate whether the another vehicle 200 will cross the alert line WL within a predetermined time by calculating the distance between the another vehicle 200 and the alert line WL based on the position and the movement direction 200C of the another vehicle 200, and dividing the calculated distance by the speed of the another vehicle 200.

The periphery alert device-use ECU 30 according to the third embodiment may extend/contract the alert line according to the angle formed by the movement direction of the self-vehicle and the movement direction of the another vehicle.

Figure 16:
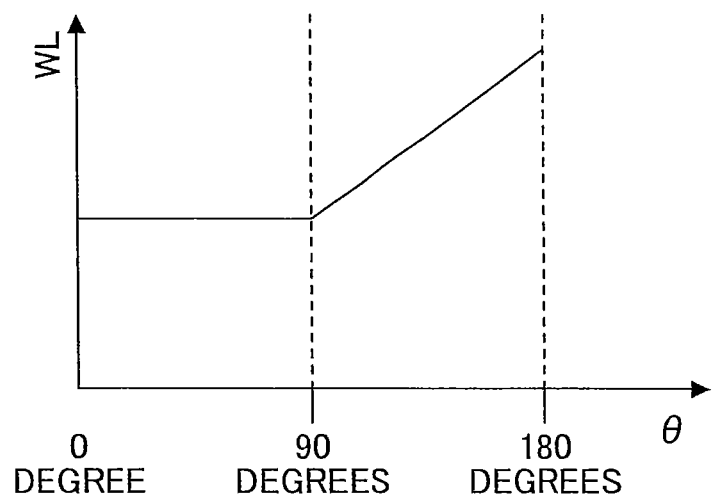
FIG. 16 illustrates an example of a corresponding relationship between an alert line WL and an angle θ.

In this case, (1) as illustrated in FIG. 16, the periphery alert device-use ECU 30 may set the length of the alert lines WL so that the alert lines WL are fixed when the angle $\theta$ formed by the movement direction of the self-vehicle and the movement direction of the another vehicle is between zero degrees and 90 degrees, and so that the alert lines WL are shorter as the angle $\theta$ becomes closer to 90 degrees and longer as the angle $\theta$ becomes closer to 180 degrees when the angle $\theta$ is between 90 degrees and 180 degrees.

Figure 17:
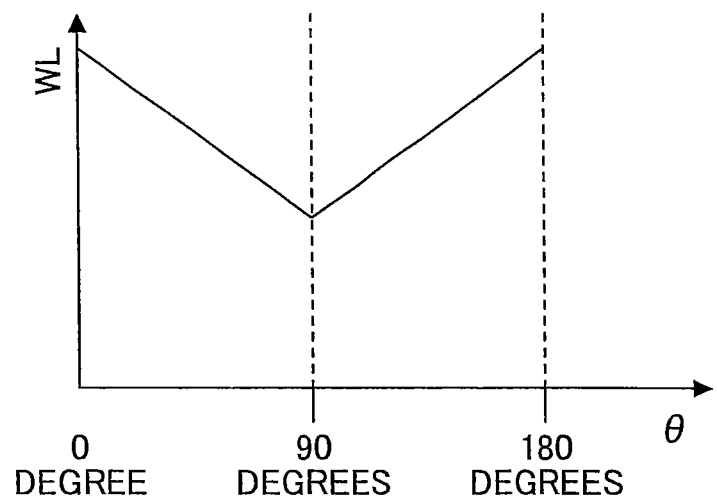
FIG. 17 illustrates an example of a corresponding relationship between an alert line WL and an angle θ.

Furthermore, (2) as illustrated in FIG. 17, the periphery alert device-use ECU 30 may set the length of the alert lines WL so that the alert lines WL are shorter as the angle $\theta$ formed by the movement direction of the self-vehicle and the movement direction of the another vehicle becomes closer to 90 degrees and longer as the angle $\theta$ becomes further away from 90 degrees.

FIG. 18 illustrates examples of alert lines WL set in various situations, in a case of complying with (1) described above. As illustrated, the alert lines WL are changed to be made longer in a situation where it is most required to be alerted, where the self-vehicle 100 is starting to reverse and another vehicle is approaching from an opposite direction. As a result, an alert can be appropriately made to another vehicle behind the vehicle. Furthermore, in this case also, the alert lines WL may be reset according to the movement of the self-vehicle 100, as in the first embodiment.

According to the vehicle periphery alert device 3 of the present embodiment described above, the alert operation activating device 20 is caused to operate when it is determined that another vehicle will cross the alert line WL within a predetermined time. Therefore, an alert can be appropriately made to another vehicle behind the vehicle. Furthermore, there is no need to calculate the parking angle advance at the time of parking or storing the parking angle in a non-volatile memory, and therefore an alert can be made, while suppressing an increase in the cost and weight.

Furthermore, according to the vehicle periphery alert device 3 of the present embodiment, when the alert lines are extended/contracted according to the angle formed by the movement direction of the self-vehicle and the movement direction of the another vehicle, the alert can be made even more appropriately to another vehicle behind the vehicle.

Another Embodiment

In the above, embodiments are used describe a best mode for carrying out the present invention; however, the present invention is not limited to the specific embodiments described herein, and various modifications and replacements may be made without departing from the scope of the present invention.

For example, the alert operation activating device 20 may perform automatic braking control, instead of (or in addition to) emitting an alert sound by a sound emitting device such as a speaker and a buzzer, etc. In this case, the alert operation activating device 20 includes an electronic control type brake device which can output a braking force separately from the position of the brake pedal.

Figure 19:
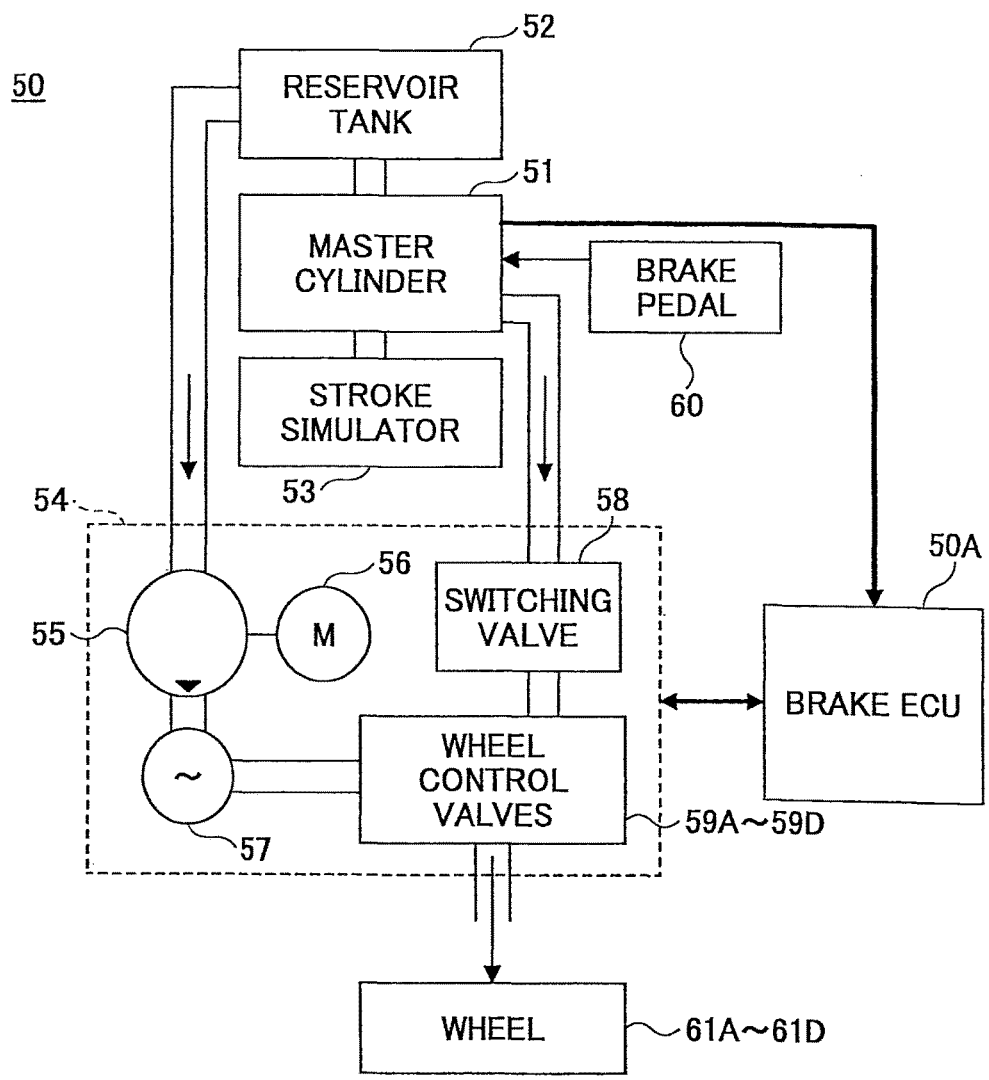
FIG. 19 illustrates an example of a configuration of an electronic control type brake device 50 that may be adopted as the alert operation activating device 20.

FIG. 19 illustrates an example of a configuration of an electronic control type brake device 50 that may be adopted as the alert operation activating device 20. The electronic control type brake device 50 includes a brake ECU 50A, a master cylinder 51 to which a brake operation made to the brake pedal is transmitted, a reservoir tank 52 for accumulating a brake liquid, a stroke simulator 53, and a brake actuator 54 for adjusting the braking force output to the respective wheels. The brake actuator 54 includes a pump 55, a motor 56 for driving the pump 55, an accumulator 57 whose internal hydraulic pressure is maintained at a high level by the hydraulic pressure sent from the pump 55, a switching valve 58 that can block the hydraulic pressure from the master cylinder 51, and wheel control valves 59A, 59B, 59C, and 59D, which are provided for the respective wheels 61A through 61D, for adjusting the braking force output to the wheels by opening and closing operations (as a matter of simplification, in FIG. 5, these are illustrated as one block). The hydraulic pressure path flowing back to the reservoir tank 52 from the wheels are not illustrated or further described.

In the electronic control type brake device 50, the switching valve 58 is in a closed state under regular circumstances, and the paths between the master cylinder 51 and the respective wheel control valves 59A through 59D are blocked. Meanwhile, the accumulator pressure inside the accumulator 57 is monitored by the brake ECU 50A, and when the accumulator pressure drops below a predetermined level, the motor 56 is driven to raise the accumulator pressure. In this state, when the driver steps on a brake pedal 60, the master cylinder pressure generated in a hydraulic chamber inside the master cylinder 51 is input to the brake ECU 50A by communication. The brake ECU 50A controls the respective wheel control valves 59A through 59D so that a braking force according to the master cylinder pressure is output.

Furthermore, the electronic control type brake device 50 can output a desired braking force by controlling the respective wheel control valves 59A through 59D irrespective of the extent to which the brake pedal 60 is stepped on.

The electronic control type brake device 50 is not limited to an electronic control type brake device that operates based on hydraulic pressure; an electronic control type brake device that operates based on an electric actuator may be used.

Furthermore, the alert area WA is set as a rectangular area; however, the area may have other shapes such as a circle or an oval.

INDUSTRIAL APPLICABILITY

The present invention may be applied to the automobile industry, automobile component manufacturers, and computer software industries for automobiles, etc.

DESCRIPTION OF REFERENCE SYMBOLS

1, 2, 3 vehicle periphery alert device
10 another vehicle detecting device
20 alert operation activating device
21 buzzer
22 indicator
23 display device
30 periphery alert device-use ECU
40 ignition switch
42 vehicle speed sensor
44 shift position sensor
46 accelerator opening sensor
50 electronic control type brake device
100 self-vehicle
WA alert area
WAF furthest end part
D distance
WL alert line

What is claimed is:

1. A vehicle periphery alert device installed in a vehicle that operates when the vehicle starts to reverse from a parked state, the vehicle periphery alert device comprising:
    control circuitry programmed to set a virtual alert line extending behind the vehicle from a side edge part of the vehicle, and to activate a sound emitting device when it is determined that another vehicle will cross the alert line within a predetermined time, the virtual alert line remaining straight while an angle formed by trajectories of the vehicle and the another vehicle changes, wherein
    the control circuitry is further programmed to extend and contract the alert line according to an angle formed by a movement direction of the vehicle and the movement direction of the another vehicle, and
    the control circuitry is further programmed to set the alert line so that the alert line continuously increases as the angle formed by the movement direction of the vehicle and the movement direction of the another vehicle goes from 90 degrees to 180 degrees.

2. The vehicle periphery alert device according to claim 1, wherein the control circuitry is further programmed to set a secondary virtual alert line extending alongside the vehicle from the side edge part of the vehicle and projecting in a direction opposite to that of the virtual alert line, the secondary virtual alert line terminating at a location flush with a location of a windshield of the vehicle.

3. A vehicle periphery alert device installed in a vehicle that operates when the vehicle starts to reverse from a parked state, the vehicle periphery alert device comprising:
    control circuitry programmed to set a virtual alert line extending behind the vehicle from a side edge part of the vehicle, and to activate a sound emitting device when it is determined that another vehicle will cross the alert line within a predetermined time, the virtual alert line remaining straight while an angle formed by trajectories of the vehicle and the another vehicle changes, wherein
    the control circuitry is further programmed to extend and contract the alert line according to an angle formed by a movement direction of the vehicle and the movement direction of the another vehicle, and
    the control circuitry is further programmed to set the alert line so that the alert line continuously decreases as the angle formed by the movement direction of the vehicle and the movement direction of the another goes to 90 degrees.

4. The vehicle periphery alert device according to claim 1, wherein the maximum length of the alert line is determined according to the angle formed by the movement direction of the vehicle and the movement direction of the another vehicle.

5. The vehicle periphery alert device according to claim 1, wherein the control circuitry is further programmed to set the alert line so that the alert line is constant when the angle is between 0 degrees and 90 degrees.

6. The vehicle periphery alert device according to claim 3, wherein the control circuitry is further programmed to set the alert line so that the alert line continuously decreases as the angle goes from 0 degrees to 90 degrees and the alert line continuously increases as the angle goes from 90 degrees to 180 degrees.

7. The vehicle periphery alert device according to claim 3, wherein the control circuitry is further programmed to set a secondary virtual alert line extending alongside the vehicle from the side edge part of the vehicle and projecting in a direction opposite to that of the virtual alert line, the secondary virtual alert line terminating at a location flush with a location of a windshield of the vehicle.

* * * * *